US011209803B2

(12) United States Patent
Glas et al.

(10) Patent No.: US 11,209,803 B2
(45) Date of Patent: Dec. 28, 2021

(54) FIREWALL SYSTEM AND METHOD FOR ESTABLISHING SECURED COMMUNICATIONS CONNECTIONS TO AN INDUSTRIAL AUTOMATION SYSTEM

(71) Applicant: Siemens Aktiengesellschaft, Munich (DE)

(72) Inventors: Karl Glas, Herzogenaurach (DE); Sven Gottwald, Nuremberg (DE)

(73) Assignee: Siemens Aktiengesellschaft, Munich (DE)

( * ) Notice: Subject to any disclaimer, the term of this patent is extended or adjusted under 35 U.S.C. 154(b) by 405 days.

(21) Appl. No.: 16/316,845

(22) PCT Filed: Jun. 27, 2017

(86) PCT No.: PCT/EP2017/065844
§ 371 (c)(1),
(2) Date: Jan. 10, 2019

(87) PCT Pub. No.: WO2018/010949
PCT Pub. Date: Jan. 18, 2018

(65) Prior Publication Data
US 2019/0317481 A1    Oct. 17, 2019

(30) Foreign Application Priority Data
Jul. 12, 2016 (EP) .................................. 16179006

(51) Int. Cl.
*H04L 29/00* (2006.01)
*G05B 19/418* (2006.01)
*H04L 29/06* (2006.01)

(52) U.S. Cl.
CPC ...... *G05B 19/4185* (2013.01); *H04L 63/0263* (2013.01); *H04L 63/0272* (2013.01);
(Continued)

(58) Field of Classification Search
CPC ...... G05B 19/4185; G05B 2219/25205; H04L 63/0263; H04L 63/0272; H04L 63/101;
(Continued)

(56) References Cited

U.S. PATENT DOCUMENTS 7,346,922 B2 * 3/2008 Miliefsky ........... H04L 63/0272
726/11
7,958,549 B2    6/2011 Nakae et al.
(Continued)

FOREIGN PATENT DOCUMENTS

EP    2461538    6/2012

OTHER PUBLICATIONS

Anonymous: "DNP3—Wikipedia", XP055320228, URL:https://en.wikipedia.org/w/index.php?title=DNP3&oldid=727297197, gefunden am Nov. 16, 2016, p. 2; 2016.
(Continued)

*Primary Examiner* — Don G Zhao
(74) *Attorney, Agent, or Firm* — Cozen O'Connor

(57) ABSTRACT

A connection management device for establishing secured communications connections to an industrial automation system, wherein the device provides, in cases of a positive authorization verification outcome, access control information for establishing an encrypted communication connection between a first communication unit of a requesting user and a selected second communication unit, where the connection management device is formed by a server instance running on a firewall system, where data packets transmitted via an encrypted communications connection between the first communication unit of the requesting user and the selected second communication unit are encrypted for verification by the firewall system, based on specified security rules and, in cases of a successful verification, the data packets are forwarded encrypted to the first communication
(Continued)

unit of the requesting user or to the selected second communication unit.

14 Claims, 2 Drawing Sheets

(52) U.S. Cl.
CPC ........ H04L 63/0428 (2013.01); H04L 63/083 (2013.01); H04L 63/101 (2013.01); *G05B 2219/25205* (2013.01)

(58) Field of Classification Search
CPC ............... H04L 63/083; H04L 63/0428; H04L 63/0281; Y02P 90/02
See application file for complete search history.

(56) References Cited

U.S. PATENT DOCUMENTS

| | | | |
|---|---|---|---|
| 8,555,373 B2 | 10/2013 | Batke et al. | |
| 2001/0014150 A1* | 8/2001 | Beebe | H04L 63/0218 379/189 |
| 2005/0138204 A1* | 6/2005 | Iyer | H04L 63/164 709/242 |
| 2005/0210291 A1* | 9/2005 | Miyawaki | H04L 29/12066 726/5 |
| 2006/0053290 A1* | 3/2006 | Randle | G06Q 20/388 713/169 |
| 2008/0062167 A1* | 3/2008 | Boggs | G06T 19/00 345/419 |
| 2008/0126794 A1* | 5/2008 | Wang | H04L 63/0823 713/151 |
| 2008/0155647 A1* | 6/2008 | Miyawaki | H04L 63/0227 726/1 |
| 2009/0307753 A1* | 12/2009 | Dupont | H04L 63/0272 726/3 |
| 2011/0058208 A1* | 3/2011 | Takahashi | G06F 3/1287 358/1.14 |
| 2012/0266209 A1* | 10/2012 | Gooding | H04L 63/20 726/1 |
| 2013/0291060 A1* | 10/2013 | Moore | G16H 40/63 726/1 |
| 2015/0113264 A1* | 4/2015 | Wang | H04L 63/02 713/151 |
| 2016/0085972 A1* | 3/2016 | Luo | H04L 63/10 713/153 |
| 2016/0366105 A1* | 12/2016 | Smith | H04L 63/0428 |
| 2017/0012876 A1* | 1/2017 | Bamford | H04L 45/04 |
| 2017/0364908 A1* | 12/2017 | Smith | G06Q 20/023 |

OTHER PUBLICATIONS

PCT International Search Report and Written Opinion of International Searching Authority dated Aug. 9, 2017 corresponding to PCT International Application No. PCT/EP2017/065844 filed Jun. 27, 2017.

* cited by examiner

FIREWALL SYSTEM AND METHOD FOR ESTABLISHING SECURED COMMUNICATIONS CONNECTIONS TO AN INDUSTRIAL AUTOMATION SYSTEM

CROSS-REFERENCE TO RELATED APPLICATIONS

This is a U.S. national stage of application No. PCT/EP2017/065844 filed Jun. 27, 2017. Priority is claimed on EP Application No. 16179006 filed Jul. 12, 2016, the content of which is incorporated herein by reference in its entirety.

BACKGROUND OF THE INVENTION

1. Field of the Invention

The invention relates to industrial automation systems and, more particularly, to a firewall system and method for establishing secured communication connections to an industrial automation system.

2. Description of the Related Art

Industrial automation systems are used for the monitoring and open-loop and closed-loop control of technical processes, especially in the fields of production, process and building automation, and enable an operation of control devices, sensors, machines and industrial systems, which is designed to occur as autonomously and independently of human intervention as possible. A particularly important feature is the provision of monitoring, control and regulation functions in real time. Faults in communication connections between automation devices or computer units of an industrial automation system can lead to a disadvantageous repetition of a transmission of a service request. In particular, messages that are not or not completely transmitted can prevent an industrial automation system from transitioning to or remaining in a safe operating condition and lead to a failure of an industrial system. A special set of problems in industrial automation systems results from message traffic with relatively many, but relatively short messages to be transmitted in real time.

U.S. Pat. No. 8,555,373 B2 discloses a firewall provided between a source device and a target device, which comprises a hardware security component for testing data extracted from a data packet against an authorized list. In addition, the hardware security component performs a state-based test based on a protocol. The firewall can be configured as a security proxy, and via a software security component can enable secured sessions between two subscribers. For authentication, or decryption of packets to be tested and encryption of tested packets, the software security component relies on the hardware security component.

U.S. Pat. No. 7,958,549B2 discloses a firewall with an encryption processor and a virtualized server. In this system the encryption processor is arranged upstream of the virtualized server and decrypts encrypted data packets, which are then forwarded to the virtualized server for processing. In the opposite direction, the encryption processor receives data packets processed by the virtualized server in order to encrypt this forwarding.

To protect confidential information or data, industrial communications networks also use Virtual Private Networks (VPN) communication connections. In the case of VPN communications connections, an end-to-end encryption is performed for data transmitted between a sender and a receiver. A sender can simultaneously set up and use a plurality of VPN communication connections to a plurality of receivers.

To manage a large number of VP-connections of a remote maintenance system, in which different systems or system components to be controlled within an industrial communication network can be accessed from a plurality of remote maintenance computers outside of an industrial communication network, rendezvous servers are provided. Here, users of remote monitoring computers log on to the rendezvous server, for example, with their user ID, and request access from this to a system, a system component or a field device. If the registration and request are successful, the rendezvous server then causes VPN communication connections to be established either statically or dynamically between communication nodes of a remote maintenance process and connects them together. This process establishes an encrypted end-to-end communication connection between a remote maintenance computer, on the one hand, and a system, a system component or a field device on the other. However, such an end-to-end communication connection, which is secure against eavesdropping, inherently prevents any control over data or information that is exchanged between the communication nodes of a remote maintenance process. In particular, it cannot be readily verified whether impermissible interventions in a system, system component or a field device are initiated from a remote maintenance computer, or whether permissible communications or automation system protocols are used.

SUMMARY OF THE INVENTION

In view of the foregoing, it is therefore an object of the present invention to provide a method for establishing secured communication connections to an industrial communication system, which enables both a data transmission secured against eavesdropping while allowing the verification of the transmitted data, and to create a suitable device for implementing the method.

This and other objects and advantages are achieved in accordance with the invention by a firewall system and by a method for establishing secured communications connections to an industrial automation system, where communication links are established from first communication devices outside of the industrial automation system to second communication devices assigned to the industrial automation system, via a connection management device. The connection management device may be, in particular, a rendezvous server. In addition, second communication devices can be integrated into automation devices, or assigned to these. In the event of a request to establish a connection to a selected second communication device by a requesting user of a first communication device, the connection management device performs an authorization verification for the requesting user based on an access control list. The access control list preferably comprises user-specific information about each permissible communication connection between at least one first communication device and at least one second communication device.

In accordance with the invention, in the event of a positive authorization verification outcome the connection management device provides access control information for establishing an encrypted communication connection between the first communication device of the requesting user and the selected second communication device for these communication devices.

The connection management device is formed by a server instance running on a firewall system. In addition, data packets transmitted via an encrypted communication connection between the first communication device of the requesting user and the selected second communication device are decrypted for a verification by the firewall system based on defined security rules. The defined security rules can comprise in particular firewall rules and/or rules relating to the admissibility of control commands specified in data packets and/or control parameters for automation devices. Data packets that are successfully verified based on the defined security rules are forwarded by the firewall system in encrypted form to the first communication device of the requesting user or to the selected second communication device. This allows data traffic between the first communication device of the requesting user and the selected second communication device to be verified bi-directionally. Preferably, data packets to be verified from the first communication device of the requesting user to the selected second communication device are decrypted, verified and forwarded to the second communication device by the firewall system after successful verification, while data packets to be verified from the selected second communication device to the first communication device of the requesting user are decrypted, verified and after successful verification forwarded to the first communication device by the firewall system. The firewall system is preferably arranged in a secured communication network of the industrial automation system, and advantageously rejects data packets that do not comply with the defined security rules. As an alternative to rejecting the data packets that do not comply with the defined security rules, a security alarm could be generated, for example.

In accordance with a particularly preferred embodiment of the present invention, the communication connections established via the connection management device between first communication devices and second communication devices are virtual private network (VPN) connections. In addition, the authentication verification comprises an authentication of the requesting user against the connection management device. Advantageously, the connection management device provides access control information to the requesting user regarding the use of a VPN connection between the first communication device of the requesting user and the selected second communication device only after an authentication of the requesting user. The access control information items can comprise, for example, cryptographic keys or passwords for VPN sessions, or temporarily valid passwords. In accordance with a further embodiment, the verification by the firewall system based on the defined security rules comprises a verification of the correctness of passwords for VPN sessions or temporarily valid passwords, and in which the firewall system rejects data packets, for the transmission of which incorrect passwords have been specified.

In accordance with an advantageous embodiment of the invention, in the case of a positive authorization verification outcome, the connection management device establishes an encrypted communications link to the first communication device of the requesting user and to the selected second communication device, and links these communication communications to each other. In addition, the data packets transmitted via the encrypted communication connection between the first communication device of the requesting user and the selected second communication device are preferably decrypted by the firewall system and verified on the basis of the defined security rules, where data packets to be forwarded that are successfully verified based on the defined security rules are also encrypted by the firewall system. In accordance with a particularly preferred embodiment of the present invention, a decryption and/or encryption of data packets is performed in hardware by the firewall system.

It is also an object of the invention to provide a firewall system for performing the method in accordance with the disclosed embodiments, where the firewall system is configured for a verification of data packets based on defined security rules, in particular by configuration. In addition, the firewall system is configured to process at least one server instance. The server instance forms a connection management device, which is configured to establish a communications connection from first communication devices outside of an industrial automation system to second communication devices assigned to the industrial automation system. The connection management device is additionally configured, in the event of a request, to set up a connection to a selected second communication device by a requesting user of a first communication device, and to perform an authorization verification for the requesting user based on an access control list.

In addition, in accordance with the disclosed embodiments of the invention, the connection management device is additionally configured, in the event of a positive authorization verification outcome, to provide access control information for establishing an encrypted communications connection between the first communication device of the requesting user and the selected second communication device for these communication devices. Furthermore, the firewall system is additionally configured to decrypt data packets that are transmitted via an encrypted communications connection between the first communication device of the requesting user and the selected second communication device for the verification based on defined security rules. Moreover, the firewall system is additionally configured to forward data packets successfully verified based on the defined security rules in encrypted form to the first communication device of the requesting user or to the selected second communication device.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The present invention will be described in more detail below by reference to the drawing, in which.

DETAILED DESCRIPTION OF THE EXEMPLARY EMBODIMENTS

Figure 1:
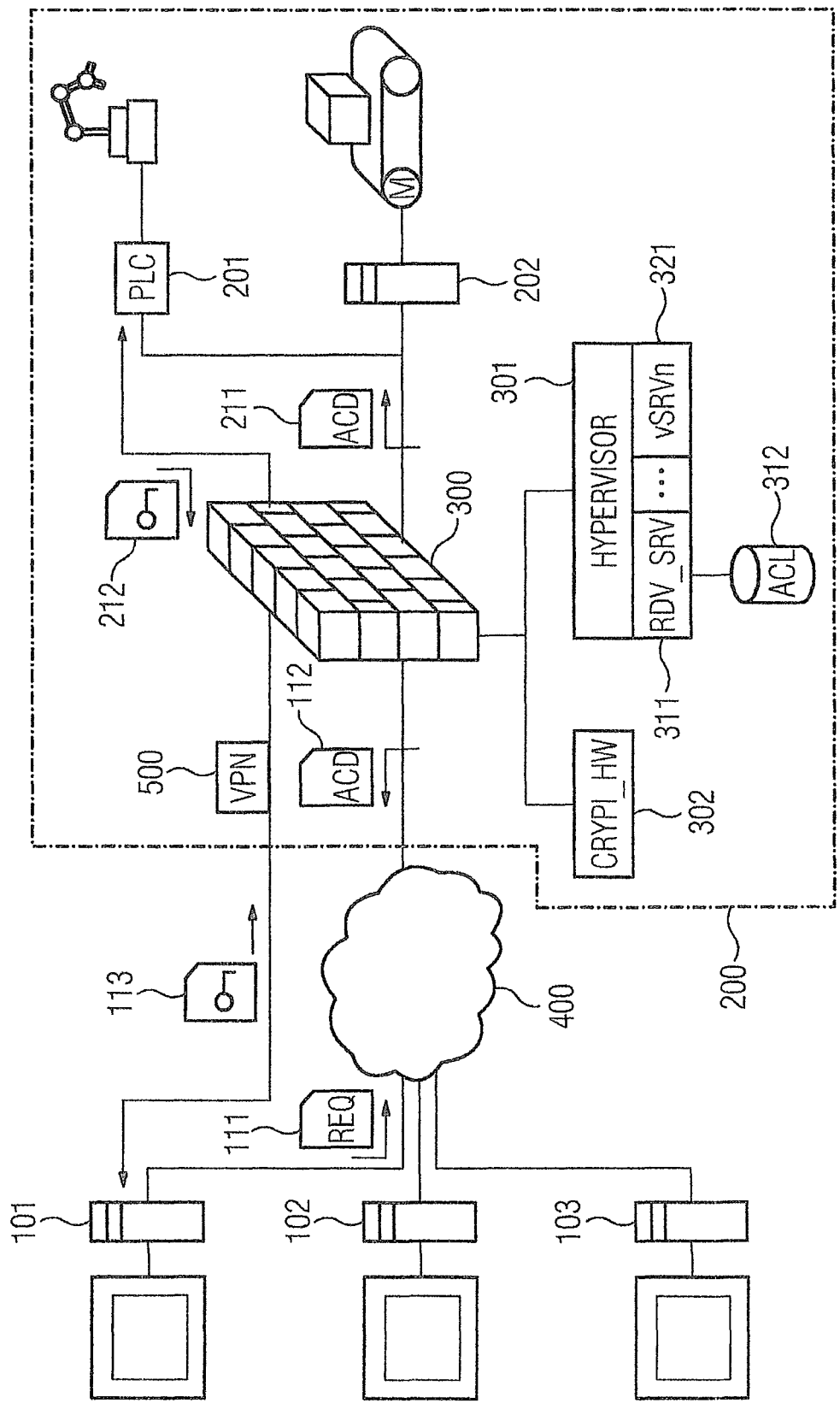
FIG. 1 is an illustration showing an arrangement having a plurality of remote maintenance computers outside of an industrial automation system and a firewall system, as well as a plurality of automation devices within the industrial automation system.

The arrangement shown in FIG. 1 comprises a plurality of remote maintenance computers 101, 102, 103, which are connected via a Wide Area Network 400 to a communication network of an industrial automation system 200. The remote maintenance computers 101, 102, 103 can be implemented, for example, as a PC, laptop or tablet PC. The industrial automation system 200 comprises a firewall system 300 for protection against unauthorized message traffic, which verifies in particular incoming data packets in the industrial automation system 200 based on defined security rules. These security rules in the present example comprise standard firewall rules and rules relating to the admissibility of control commands and/or control parameters for automation devices 201-202 of the industrial automation system 200 specified in data packets. Thus, the communication network of the industrial automation system 200, in which the firewall system 300 is arranged, offers access facilities to the automation devices 201-202 controlled by security techniques and is therefore secured. The Wide Area Network 400 can be, for example, a mobile wireless network or an IP-based communication network.

The automation devices 201-202 each comprise integrated or assigned communication modules or devices and can be programmable-logic or PC-based controllers of a machine or a technical system, such as a robot or a transport device. In particular, the automation devices 201-202 each comprise at least one central unit and one input/output unit. The input/output units are used for an exchange of control and measurement variables between the respective automation device 201-202 and a machine or device controlled by the automation device 201-202. The central processing units of the automation device 201-202 are particularly important for determining suitable control variables from the recorded measurement variables.

The firewall system 300 is computer based and in the present embodiment comprises a hypervisor 301 as a hardware abstraction element between the physically present hardware of the firewall system and executable operating systems that can be installed on the firewall system 300. Such a hypervisor 301 enables the deployment of a virtual environment, which comprises partitioned hardware resources, such as processors, memories or I/O devices. Instead of a hypervisor 301, in principle other known virtualization concepts can also be used as hardware abstraction means for providing server instances 311, 321 running on the firewall system 300. In the interests of greater illustration clarity, the hypervisor 301 is shown separately from the firewall system 300 in the FIG. 1.

Nevertheless, the hypervisor 301 is a component of the firewall system 300. This also applies to a hardware-implemented cryptology component 302, which is shown in FIG. 1 as being separate from the firewall system 300, but in fact is comprised by the firewall system 300.

As a result of such a server instance running on the firewall system 300, a rendezvous server 311 is formed as a connection management device. This rendezvous server 311 is configured to establish, manage and control communication connections from first communication devices outside of the industrial automation system 200 to second communication devices assigned to the industrial automation system 200. The first communication devices in this exemplary embodiment include the remote maintenance computers 101, 102, 103, while second communication devices are communication devices and/or modules that are assigned to the automation devices 201-202 or comprised by these.

When a request 111 is made to establish a connection to a selected automation device 201 by a requesting user of a remote maintenance computer 101, the rendezvous server 311, based on an access control list 312 managed by the rendezvous server 311, performs an authorization verification for the requesting user in relation to the selected automation device 201. The access control list 312 preferably comprises user-specific information about each permissible communication connection between at least one first communication device and at least one second communication device.

If this authorization check produces a positive result, then the rendezvous server 311 provides access control information 112, 211 to establish an encrypted communication connection 500 between the remote maintenance computer 101 of the requesting user and the selected automation device 201 for these communication nodes. In this exemplary embodiment, the encrypted communication connections established between remote maintenance computers 101, 102, 103 and automation devices 201-202 are Virtual Private Network (VPN) connections. The access control information items 112, 211 can comprise, for example, cryptographic keys or passwords for VPN sessions, or temporarily valid passwords. The authorization verification comprises an authentication of the requesting user against the rendezvous server 311, which provides access control information 112 to the requesting user regarding the use of a VPN connection between the remote maintenance computer 101 of the requesting user and the selected automation device 201 only after an authentication of the requesting user.

Data packets 113, 212 transmitted via the VPN connection 500 between the remote maintenance computer 101 of the requesting user and the selected automation device 201 are decrypted by the firewall system 300 and verified based on the defined security rules. Data packets that are successfully verified based on the defined security rules are again encrypted by the firewall system 300 and forwarded to the remote maintenance computer 101 of the requesting user or to the selected automation device 201. A decryption or encryption of data packets to be tested or that have been tested respectively is performed by the firewall system 300 in hardware. For this purpose, the hardware-implemented cryptology component 302 comprised by the firewall system 300 is provided. Data packets that do not comply with the defined security rules are rejected by the firewall system 300.

In the present exemplary embodiment, the verification by the firewall system 300 based on the defined security rules also comprises a verification of the correctness of passwords for VPN sessions or temporarily valid passwords. The firewall system 300 rejects data packets, for the transmission of which incorrect passwords have been specified.

In principle, the VPN connection 500 established between the remote maintenance computer 101 of the requesting user and the selected automation device 201 can comprise two partial VPN connections, which are scheduled on the rendezvous server 311. In the event of a positive authorization verification outcome, the rendezvous server 311 establishes an encrypted communication connection to the remote maintenance computer 101 of the requesting user and to the selected automation device 201 and links these communication connections to each other.

Figure 2:
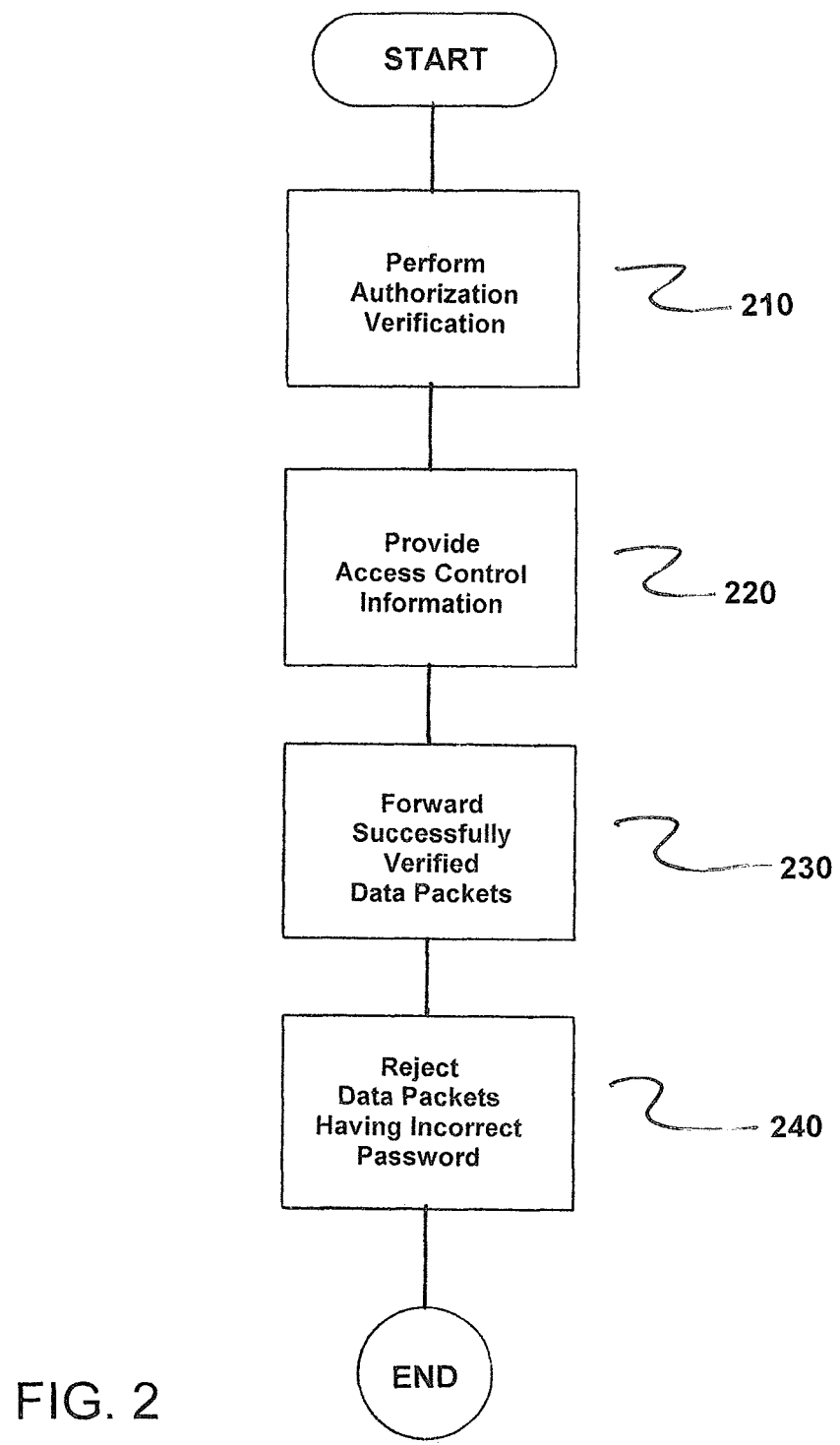
FIG. 2 is a flowchart of the method in accordance with the invention.

FIG. 2 is a flowchart of a method for establishing secured communications connections to an industrial automation system in which communications connections are set up from first communications devices 101, 102, 103 outside of the industrial automation system 200 to second communications devices 201, 202 assigned to the industrial automation system via a connection management device 311, where the communications connections established via the connection management device 311 between first communications devices 101, 102, 103 and second communications devices 201, 202 are Virtual Private Network (VPN) connections, the connection management device 311 is formed by a server instance running on a firewall system 300, and where data packets 113, 212 transmitted via an encrypted communications connection between the first communication device 101 of the requesting user and the selected second communication device 201 are decrypted for a verification by the firewall system 300 based on defined security rules.

The method comprises performing, by the connection management device 311, an authorization verification for a requesting user based on an access control list 312 in an event of a request 111 to set up a connection to a selected second communication device 201 by a requesting user of a first communication device 101, as indicated in step 210. In accordance with the invention, the authorization verification comprising an authentication of the requesting user against the connection management device 311.

Next, the connection management device 311 provides access control information 112, 211 for establishing an encrypted communications connection 500 between the first communication device 101 of the requesting user and the selected second communication device 201 for these communication devices in an event of a positive authorization verification outcome, as indicated in step 220. In accordance with the invention, the connection management device provides access control information to the requesting user regarding the use of a VPN connection between the first communication device of the requesting user and the selected second communication device only after an authentication of the requesting user, and the access control information items comprises passwords for VPN sessions or temporarily valid passwords.

Next, the firewall system 300 forwards data packets successfully verified based on defined security rules in encrypted form to at least one of (i) the first communication device 101 of the requesting user and (ii) the selected second communication device 201, as indicated in step 230. In accordance with the invention, the verification by the firewall system based on the defined security rules comprises the verification of the correctness of passwords for VPN sessions or temporarily valid passwords.

Next, the firewall system 300 rejects data packets for the transmission of which incorrect passwords have been specified, as indicated in step 240.

Thus, while there have been shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for establishing secured communications connections to an industrial automation system in which communications connections are set up from first communications devices outside of the industrial automation system to second communications devices assigned to the industrial automation system via a connection management device, the communications connections established via the connection management device between first communications devices and second communications devices being Virtual Private Network (VPN) connections, the connection management device being formed by a server instance running on a firewall system, and data packets transmitted via an encrypted communications connection between a first communication device of a requesting user and a selected second communication device being decrypted for a verification by the firewall system based on defined security rules, the method comprising:

performing, by the connection management device, an authorization verification for the requesting user based on an access control list in an event of a request to set up a connection to a selected second communication device by the requesting user of the first communication device, the authorization verification comprising an authentication of the requesting user against the connection management device;

providing, by the connection management device, access control information for establishing an encrypted communications connection between the first communication device of the requesting user and the selected second communication device for said first communication device of the requesting user and said selected second communication device in an event of a positive authorization verification outcome, the connection management device providing access control information to the requesting user regarding a use of a VPN connection between the first communication device of the requesting user and the selected second communication device only after an authentication of the requesting user, and the access control information items comprising passwords for VPN sessions or temporarily valid passwords;

forwarding, the firewall system, data packets successfully verified based on defined security rules in encrypted form to at least one of (i) the first communication device of the requesting user and (ii) the selected second communication device, the verification by the firewall system based on the defined security rules comprising a verification of a correctness of passwords for VPN sessions or temporarily valid passwords; and rejecting, by the firewall system, data packets for the transmission of which incorrect passwords have been specified.

2. The method as claimed in claim 1, wherein the access control list comprises user-specific information about each permissible communication connection between at least one first communication device and at least one second communication device.

3. The method as claimed in claim 1, wherein in cases of a positive authorization verification outcome, the connection management device provides an encrypted communications connection to the first communication device of the requesting user and to the selected second communication device and links these communications connections to each other.

4. The method as claimed in claim 2, wherein in cases of a positive authorization verification outcome, the connection management device provides an encrypted communications connection to the first communication device of the requesting user and to the selected second communication device and links these communications connections to each other.

5. The method as claimed in claim 1, wherein the data packets transmitted via the encrypted communications connection between the first communication device of the requesting user and the selected second communication device are decrypted by the firewall system and are verified based on the defined security rules; and wherein data packets to be forwarded that are successfully verified based on the defined security rules are encrypted by the firewall system.

6. The method as claimed in claim 2, wherein the data packets transmitted via the encrypted communications connection between the first communication device of the requesting user and the selected second communication device are decrypted by the firewall system and are verified based on the defined security rules; and wherein data packets to be forwarded that are successfully verified based on the defined security rules are encrypted by the firewall system.

7. The method as claimed in claim 3, wherein the data packets transmitted via the encrypted communications connection between the first communication device of the requesting user and the selected second communication device are decrypted by the firewall system and are verified based on the defined security rules; and wherein data packets to be forwarded that are successfully verified based on the defined security rules are encrypted by the firewall system.

8. The method as claimed in claim 5, wherein at least one of (i) a decryption of data packets and (ii) an encryption of data packets is performed by the firewall system in hardware.

9. The method as claimed in claim 1, wherein the defined security rules comprise at least one of (i) firewall rules and (ii) rules relating to an admissibility of at least one of control commands and control parameters for automation devices specified in data packets.

10. The method as claimed in claim 1, wherein the firewall system rejects data packets that do not comply with the defined security rules.

11. The method as claimed in claim 1, wherein the firewall system is arranged in a secured communication network of the industrial automation system.

12. The method as claimed in claim 1, wherein the connection management device is a rendezvous server.

13. The method as claimed in claim 1, wherein the second communication devices are integrated into automation devices or assigned to said automation devices.

14. A firewall system comprising:
a processor;
memory operatively coupled to said processor;
wherein the firewall system is configured to:
verify data packets based on specified security rules;
process at least one server instance forming a connection management device which is configured to establish a communications connection from first communication devices outside of an industrial automation system to second communication devices assigned to the industrial automation system;
wherein the communications connections established via the connection management device between first communications devices and second communications devices are Virtual Private Network (VPN) connections;
wherein the connection management device is further configured, in an event of a request, to set up a connection to a selected second communication device by a requesting user of a first communication device, and is further configured to perform an authorization verification for the requesting user based on an access control list, the authorization verification comprising an authentication of the requesting user against the connection management device;
wherein the connection management device is additionally configured, in an event of a positive authorization verification outcome, to provide access control information for establishing an encrypted communications connection between the first communication device of the requesting user and the selected second communication device for said first communication device of the requesting user and said selected second communication device;
wherein the connection management device is additionally configured to provide access control information to the requesting user regarding use of a VPN connection between the first communication device of the requesting user and the selected second communication device only after an authentication of the requesting user, the access control information items comprising passwords for VPN sessions or temporarily valid passwords; and
wherein the firewall system is further configured to:
decrypt data packets transmitted via an encrypted communications connection between the first communication device of the requesting user and the selected second communication device for the verification based on defined security rules;
forward data packets successfully verified based on the defined security rules in encrypted form to the first communication device of the requesting user or to the selected second communication device, the verification by the firewall system based on the defined security rules comprising a verification of the correctness of passwords for VPN sessions or temporarily valid passwords, and
reject data packets, for the transmission of which incorrect passwords have been specified.

* * * * *